Figure 1:
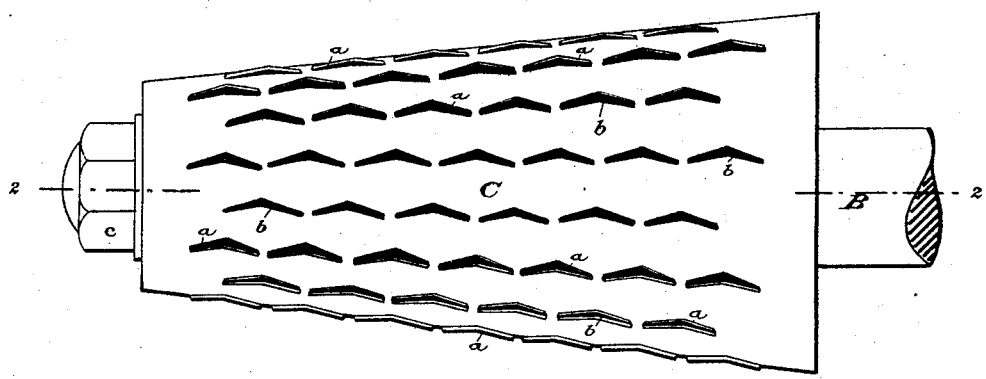

(No Model.) 3 Sheets—Sheet 1.

F. C. TAYLOR & D. C. SCOVILLE.
POUNCING TOOL FOR HATS.

No. 374,212. Patented Dec. 6, 1887.

WITNESSES:
E. B. Bolton
Edwin Leyse

INVENTOR:
Francis C. Taylor,
Delavan C. Scoville,
by G. H. W. J. Howard,
Attorneys.

(No Model.) 3 Sheets—Sheet 2.

F. C. TAYLOR & D. C. SCOVILLE.
POUNCING TOOL FOR HATS.

No. 374,212. Patented Dec. 6, 1887.

Fig. 5ª.

WITNESSES:
E. B. Bolton
Edwin Cense

INVENTOR:
Francis C. Taylor,
Delavan C. Scoville,
by Geo. W. J. Howard
Attorneys (No Model.) 3 Sheets—Sheet 3.

F. C. TAYLOR & D. C. SCOVILLE.
POUNCING TOOL FOR HATS.

No. 374,212. Patented Dec. 6, 1887.

WITNESSES:
E. B. Bolton
Edwin Leese

INVENTOR:
Francis C. Taylor,
Delavan C. Scoville,
by their Attorneys.

UNITED STATES PATENT OFFICE.

FRANCIS C. TAYLOR, OF DANBURY, CONNECTICUT, AND DELAVAN C. SCOVILLE, OF BROOKLYN, NEW YORK.

POUNCING-TOOL FOR HATS.

SPECIFICATION forming part of Letters Patent No. 374,212, dated December 6, 1887.

Application filed February 2, 1887. Serial No. 226,271. (No model.)

*To all whom it may concern:*

Be it known that we, FRANCIS C. TAYLOR, a resident of Danbury, in the county of Fairfield and State of Connecticut, and DELAVAN C. SCOVILLE, a resident of Brooklyn, in the county of Kings and State of New York, both citizens of the United States, have jointly invented certain Improvements in Pouncing-Tools for Hats, of which the following is a specification.

Our invention relates to a machine or tool for pouncing and surfacing or finishing hat-bodies; and our object is, in the main, to effect by the use of metallic cutters or cutting-edges what is ordinarily effected by the use of abrading devices, such as sand or emery paper.

Our invention consists, essentially, in constructing the pouncing machine or tool (which may be a cone or cylinder) with a metal surface, and providing such surface with cutting-edges, and in forming in front of each cutting-edge a perforation or recess extending into the body or hollow of said cone or cylinder. These are essential characteristics of our invention; but there are other novel features, all of which will be hereinafter fully described, and their novel features carefully defined in the claims.

In the drawings which serve to illustrate our invention we have shown several forms of cutting-edges variously disposed on the surface of the cone or cylinder forming the pouncing tool or machine.

Figure 2:
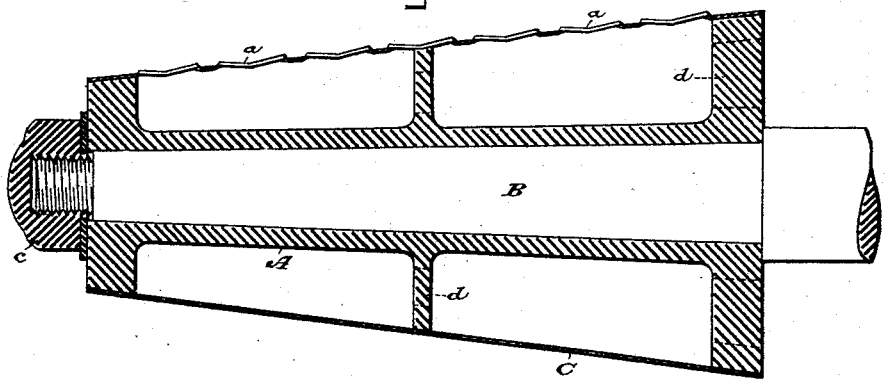
Figure 3:
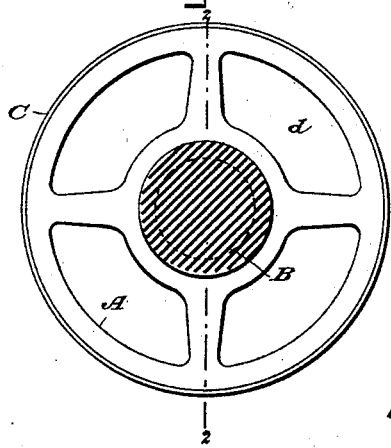
Figure 4:
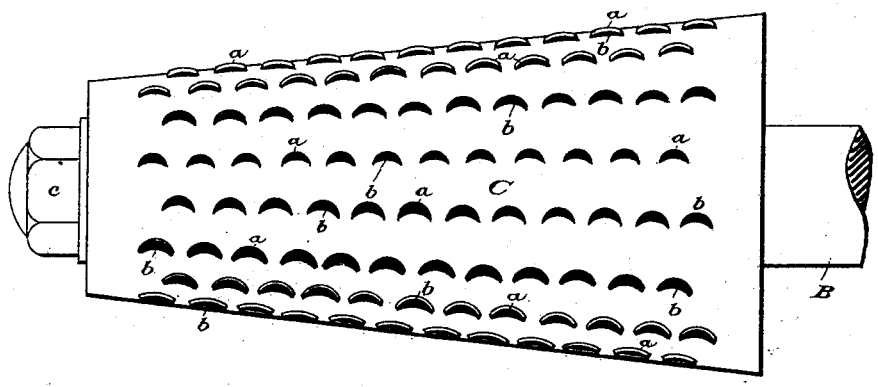
Figure 5:
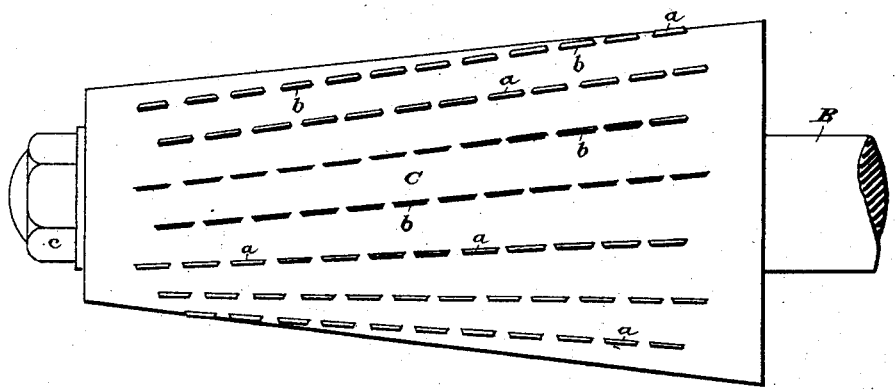
Figure 5:
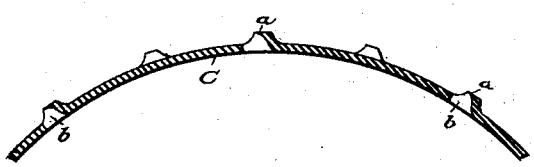
Figure 6:
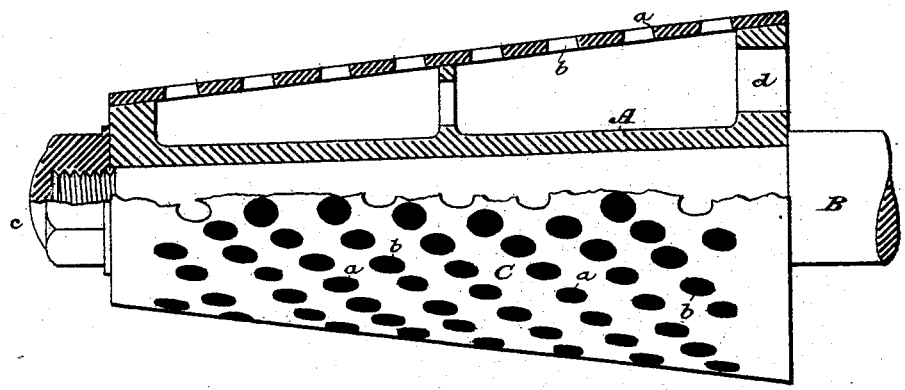
Figure 7:
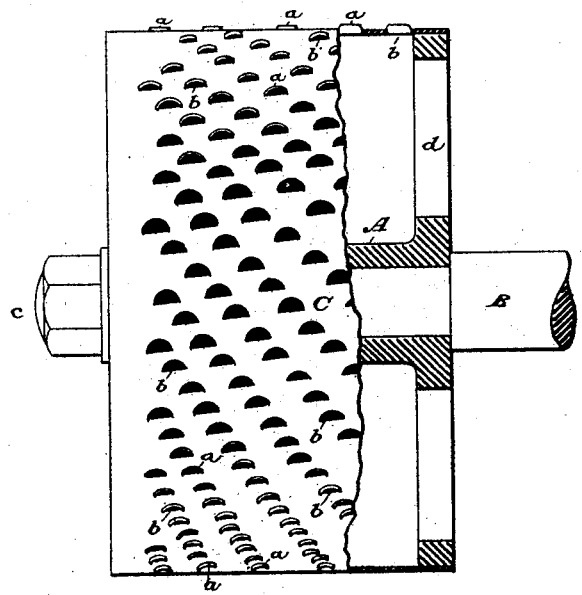

Figure 1 is a side elevation of our improved pouncing or surfacing tool, of conical form, with one form and arrangement of the cutting-edges. Fig. 2 is a vertical axial section of same, and Fig. 3 is an elevation of the larger end of same. Figs. 4 and 5 are elevations of similar cone-shaped tools constructed according to our invention, but provided with cutting-edges of different forms. In all of these views the cutting-edges are shown as raised above the general level of the convex surface of the tool, as represented in the enlarged transverse section seen in Fig. 5ª. Fig. 6 is a view, half in elevation and half in axial section, showing a tool wherein the cutting-edges are not raised. Fig. 7 illustrates the application of our invention to a tool of cylindrical form. This view is on a smaller scale than the preceding.

In carrying out our invention we usually construct the tool of a core, A, which is bored to receive the mandrel B, and a surface or shell, C, of sheet-steel, secured to said core. When constructed in this manner, we form on the surface of the shell C numerous cutting-edges, *a a*, raised a little above the general surface of the shell C, and preferably formed integrally therewith. In front of each of the raised cutting-edges *a* is an aperture or perforation, *b*, extending into the hollow of the cone.

In Figs. 1 and 2 the cutting-edges *a* are of an angular form, and are arranged in rows extending lengthwise of the tool in the direction of its axis. The cutting-edges in one row are arranged opposite the spaces between the cutting-edges in the next row, so that the tool may cut evenly throughout the whole length of its cutting-surface. We prefer to form these cutting-edges by punching the steel plate (which is to form the shell C) while it is flat, then "setting up" those edges of the apertures or perforations that are to form the cutting-edges, and then grinding said edges sharp by the external application of the tool to an emery-wheel or grindstone. The cone or cylinder thus formed may be secured to the mandrel B by means of a nut, *c*, as shown in Fig. 2.

The tool is or may be operated in the same manner as the cones, cylinders, or drums now in use.

The special advantages we claim for our tool are as follows: We dispense with sand-paper and emery-paper, which, in the ordinary tool, constantly requires replenishing. The metallic cutting-surface provided by our tool is found to present a sharper and better cutting-edge than can be obtained by sand or emery paper. The apertures in the periphery of the tool and opening into the hollow of same are in communication with an opening or openings, *d*, of some kind in the end of the cone or cylinder, and when the tool revolves rapidly air-currents will be established through the hollow of the same and apertures *b*, which will blow away all particles, débris, &c., that result from the pouncing and surfacing of the hat, and thus effectually guard against the choking or clogging of the cutters. This is another advantageous feature of our improved machine or tool.

The tool illustrated in Fig. 4 has cutting-edges $a$, of semicircular form, arranged in straight lines and "staggered," as in Fig. 1; and in the tool illustrated in Fig. 5 the cutting-edges $a$ are straight, but arranged somewhat spirally on the convex cone-surface, in order to give them what is called a "draw cut."

In Fig. 5$^a$ we have shown on an enlarged scale a cross-section of a part of the shell C, in order the better to illustrate the formation of the cutting-edges $a$ by striking-up a part of the metal, and then grinding or filing the edge of this raised portion until it is sharp.

In the tools we have described with reference to Figs. 1, 2, 3, 4, 5, 5$^a$, and 7 the cutting-edges $a$ are raised above the general level of the convex or rounded surface of the tool. In Fig. 6, however, the cutting-edges are not raised above the tool-surface, but are formed by merely boring or cutting holes in the surface of the cone. In order to produce a better cutting-edge, we prefer to bevel the cutting-margins of said holes, so as to reduce the angle of the said cutting-edge to less than ninety degrees. This is most conveniently effected by giving the holes a circular form and reaming them out to a conical form from the inside. One advantage of this construction of the cutters is that they will cut equally well in whichever direction the cone may be rotated.

In constructing our tool it is not absolutely essential that the core A shall be formed separately from the shell C and attached thereto, as it would be possible to construct these parts integrally or in one. Nor need the shell C be of sheet-steel. It may be of cast-steel, with the apertures and cutting-edges formed in the process of casting it. The form of the core and mandrel is not essential to our invention.

We disclaim herein the invention described and claimed in the application of Francis C. Taylor, filed January 4, 1886, Serial No. 187,519, which is broadly for the combination, in a pouncing-cone, of a mandrel and a surrounding perforated metallic cone; but,

Having thus described our invention, we claim—

1. In a pouncing-tool, the combination of a mandrel and a hollow cone or cylinder surrounding said mandrel, an interior space being provided, as shown, the outer surface of the cone or cylinder being provided with cutting-edges and with apertures communicating with the interior space, as specified.

2. In a pouncing-tool, a mandrel combined with a hollow metallic cylinder, a space being formed in the interior of the cylinder, as shown, said cylinder having cutting-edges on its outer surface, and apertures extending from said surface to the interior space, and having also end openings, whereby when the tool is revolved currents of air may be established through the apertures in the cylinder, substantially as and for the purpose specified.

In witness whereof we have hereunto signed our names in the presence of two subscribing witnesses.

FRANCIS C. TAYLOR.
DELAVAN C. SCOVILLE.

Witnesses:
HENRY CONNETT,
J. D. CAPLINGER.